United States Patent [19]

Gautier

[11] Patent Number: 4,757,749
[45] Date of Patent: Jul. 19, 1988

[54] BRAKE BOOSTER

[75] Inventor: Jean-Pierre Gautier, Aulnay Sous Bois, France

[73] Assignee: Bendix France, Drancy, France

[21] Appl. No.: 35,691

[22] Filed: Apr. 7, 1987

[30] Foreign Application Priority Data

Apr. 8, 1986 [FR] France ................... 86 04975

[51] Int. Cl.⁴ ............................................... F15B 9/10
[52] U.S. Cl. ................... 91/369 B; 91/369 A; 91/369 R; 91/387
[58] Field of Search ............. 91/369 R, 369 A, 369 B, 91/369 C, 387, 376 R; 60/547.1

[56] References Cited

U.S. PATENT DOCUMENTS

| | | | |
|---|---|---|---|
| 4,491,058 | 1/1985 | Morin | 91/376 R |
| 4,577,548 | 3/1986 | Gautier | 91/369 A |
| 4,590,845 | 5/1986 | Tateoka et al. | 91/369 A |
| 4,594,937 | 6/1986 | Meynier et al. | 91/369 R |

FOREIGN PATENT DOCUMENTS

| | | |
|---|---|---|
| 101658 | 2/1984 | European Pat. Off. . |
| 153888 | 9/1985 | European Pat. Off. . |
| 2506402 | 11/1982 | France . |
| 0152655 | 11/1980 | Japan ................... 91/369 C |
| 0124455 | 7/1984 | Japan ................... 91/369 A |
| 0154949 | 8/1985 | Japan ................... 91/369 A |
| 2148427 | 5/1985 | United Kingdom . |
| 2162268 | 7/1985 | United Kingdom . |

Primary Examiner—Robert E. Garrett
Assistant Examiner—Thomas E. Denion
Attorney, Agent, or Firm—Larry J. Palguta; Ken C. Decker

[57] ABSTRACT

The booster comprises a first member (23) positioning the plunger (14) and fastened in the valve body (8) and interacting with a the first zone of a shoulder (21) of the plunger to position the latter in a specific position of maximum retraction relative to the valve body (8), and a second member (29, 31) positioning the plunger and mounted pivotally in the valve body and having a ramp surface (34) formed in a first portion (29) interacting with a second zone of the first shoulder (21) to position the plunger in a specific position of rest relative to the valve body (8) under the control of a second outer portion (31) interacting with a stationary element connected to the housing (9).

11 Claims, 3 Drawing Sheets

FIG_1

BRAKE BOOSTER

The present invention relates to brake boosters, especially for motor vehicles, and more particularly pneumatic boosters of the type comprising a housing, a piston structure dividing the housing externally into two chambers, a distributor valve means arranged in a valve body integral with the piston structure and actuable by means of an input member to generate a pressure differential selectively between the chambers, the valve means having a plunger mounted axially slideably in a central bore of the valve body and connected to the input member, the plunger having at least one first peripheral shoulder and defining, at one of its ends, a first flap seat, a second flap seat formed in the valve body concentrically relative to the first flap seat and a flap means mounted in the valve body and stressed elastically towards the first and second flap seats, a restoring spring bearing in the valve body and stressing the input member in the opposite direction to the flap seats, and means of positioning the plunger which are arranged in the valve body and which interact with the plunger to assign to it at least two separate specific positions relative to the valve body, typically a position of maximum retraction or of excess opening during the return in the event of a relief of stress on the input member during a braking phase, on the one hand, and a position of rest which, in the configuration of rest of the booster, ensures a minimum actuation stroke of the booster on the other hand.

Boosters of this type are described in the documents FR-A-2,469,589 and EP-A-0,153,888. In the first of these documents, the means of positioning the plunger consist of a key mounted in the valve body with a possibility of axial movement and capable of interacting with the rear wall of the housing by coming up against it, in an arrangement which does not make it possible to guarantee reliable and accurate movement of the retaining key in relation to the valve body nor to prevent risks of interference with the relative movement of the plunger or skewing of the retaining key relative to the plunger and/or to the valve body, particularly because of the problems of keeping the key "floating" in the valve body in view of the many opposing stresses to which the key is subjected. In the second of these documents, the means of positioning the plunger consist of an element pivoting in a transverse receptacle of the valve body under the control of a tracer lever and having two cam surfaces interacting respectively with a peripheral annular shoulder of the tracer and with an adjacent peripheral surface of the tracer, in an arrangement which is more accurate in operation than that of the preceding document, but which induces a tilting torque on the tracer capable, in the course of time, of influencing the accuracy of the booster, when it is operated, and which has difficulty in successfully undergoing so-called "snatch" tests simulating an inopportune lifting of the brake pedal by the foot of the vehicle driver and resulting in a considerable pull exerted on the input member.

It is therefore an object of the present invention to provide a brake booster of the type mentioned above, of simple and robust construction, accurate and reliable in operation and, in particular, not influencing the capacities of the plunger to slide coaxially in the central bore of the valve body.

To achieve this, according to one feature of the invention, the means of positioning the plunger consists of the combination of a first positioning member fastened in the valve body and having an inner end capable of interacting with a first zone of the first shoulder of the plunger, to position the latter in a specific position of maximum retraction, and of a second positioning member mounted pivotally in the valve body and having a first portion capable of interacting with a second zone of the shoulder of the plunger and a second portion capable of interacting, in the vicinity of the position of rest of the booster, with a stationary element connected to the housing, in order, at least in this position of rest of the booster, to place the second positioning member in a specific angular position relative to the valve body positioning the plunger, via the first portion of the second retaining member, in a specific position of rest.

According to a more particular feature of the invention, the first zone of the first shoulder of the plunger and the second portion, or actuating portion, of the second positioning member interacting with the stationary element are located on one and the same side relative to a diametral plane of the tracer, the second zone of the first shoulder of the tracer being located on the other side of this diametral plane.

By means of such an arrangement, the position of retraction or of excess opening of the plunger relative to the valve body carrying the second flap seat is defined perfectly because the first shoulder of the plunger comes up against the first positioning member mounted fixedly in the valve body, without the second retaining member being stressed on this occasion. In contrast to this, when the booster reaches its position of rest, the second positioning member is then activated via its second portion, to push the plunger forwards, via its first portion, from its position of retraction previously assumed during brake release and bring it into its position of rest, without activating the first positioning member for this purpose. During the successive operations, since the first and second positioning members are each immobilized axially relative to the valve body and act on opposite zones of the shoulder of the plunger, the risks that the plunger will, in the course of time, become skewed in the bore of the valve body are eliminated completely.

The present invention will now be described by way of example with reference to the accompanying drawings in which.

In the following description and in the drawings, identical or similar elements bear the same reference numerals, if appropriate with indices.

Figure 1:
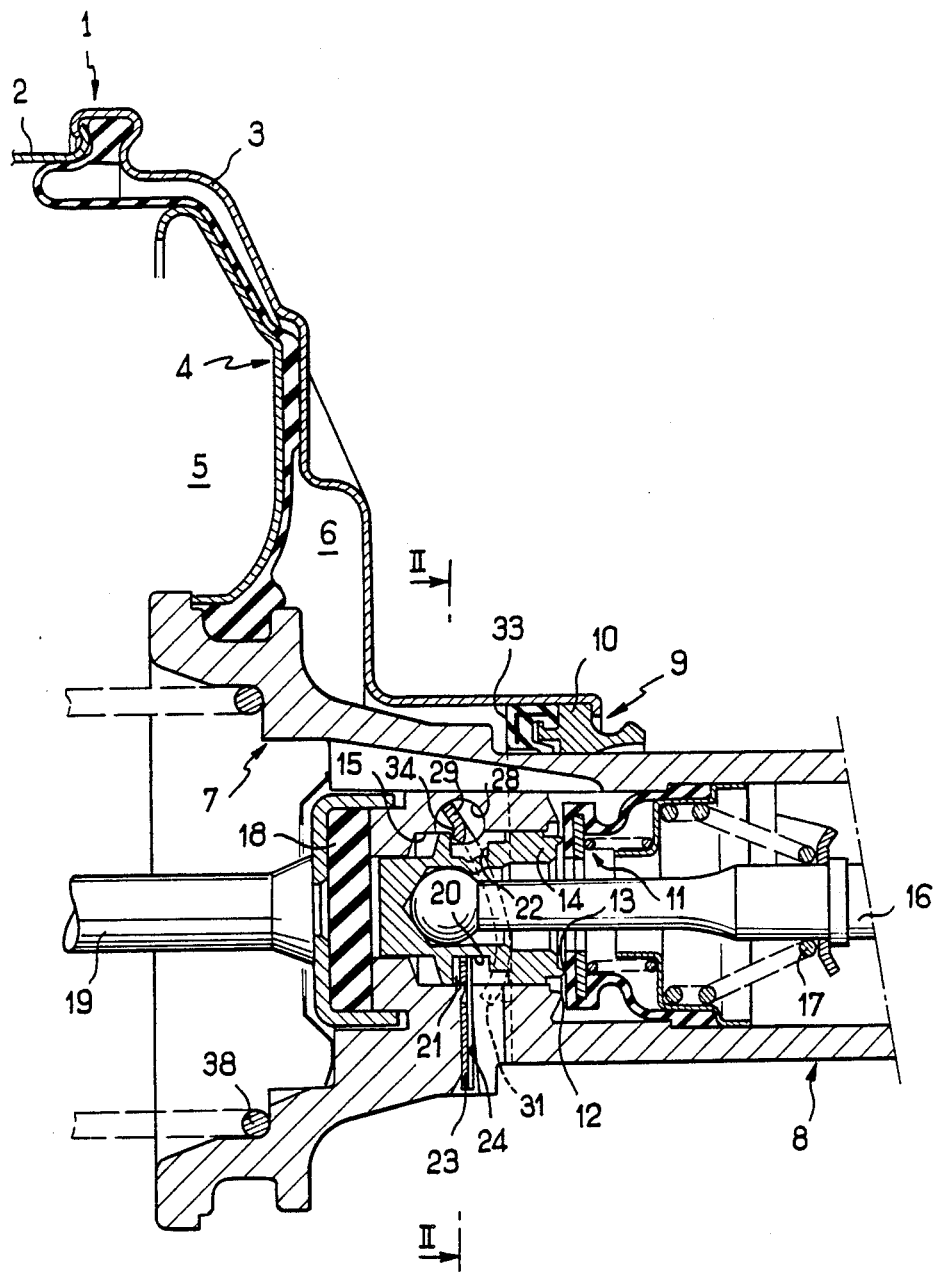
FIG. 1 is a partial view in longitudinal section of a first embodiment of a brake booster according to the invention.

As illustrated in the drawings, a pneumatic brake booster according to the invention comprises a housing 1 formed by joining together peripherally a front housing wall 2 and a rear housing wall 3 and divided internally by a movable piston wall 4 into a front chamber 5, or vacuum chamber, and a rear chamber 6, or working chamber. The movable wall 4 is fastened centrally to a hub 7 which is typically made of plastic and which is extended rearwards and outwards by means of a tubular valve body 8 guided sealingly and slideably by a guide and sealing assembly 9 mounted in a rear tubular extension 10 of the rear wall 3 of the housing 1.

Mounted in the valve body 8 is an elastically stressed flap means designated as a whole by the reference 11, which is intended to interact with a fixed flap seat 12 formed centrally in the valve body and with a movable flap seat 13 formed by the rear end of a plunger 14 sliding in a central bore 15 of the valve body 8 and fixed to the end of an input and actuating rod 16, the other end of which is intended to be connected to a vehicle brake pedal (not shown). The rod 16 (and consequently the plunger 14) is stressed rearwards by a restoring spring 17 bearing on a shoulder of the rod 16 and on a shoulder inside the valve body 8. By means of its end opposite the rod 16, the plunger 14 is capable of interacting with an elastomeric reaction disc 18 interposed between the hub 7 and an output rod 19 of the booster, intended to actuate the piston of a master cylinder associated with the booster (not shown). The plunger 14 has a peripheral annular groove 20 defining a first shoulder 21 directed rearwards and a second shoulder 22 facing it.

According to the invention, a key or first positioning member 23 is mounted fixedly in the valve body 8. The key 23, for example of the type described in the document EP-A-0,101,658 in the applicant's name, the content of which is assumed to be incorporated herein for reference, produced from a metal plate, has a general planar shape and is force-fitted in a radial groove 24 made in the valve body 8 and opening into the sliding bore 15 of the plunger 14. The key 23 has an inner end cut in the form of a U, delimited by a circular cut-out 25 and two end tabs 26, together forming, on one side of a diametral plane D of the plunger 14, an engagement zone of substantially semi-circular profile which engages without radial contact into the annular groove 20 of the plunger 14 and which is consequently capable of interacting in engagement with one or other of the shoulders 21 and 22 of the plunger 14 by coming up against it axially, so as to delimit the two end positions of axial movement of the plunger 14 relative to the valve body 8. The key 23 is locked radially in the valve body 8 by means of a profiled peg 27 of the valve body, projecting axially into the groove 24 and received in a slot made in the solid web part of the key 23.

The valve body 8 has, on the side of the diametral plane D of the plunger 14 opposite that of the groove 24 receiving the key 23, a transverse bore 28 of axis Z, which opens centrally into the bore 15 of the plunger 14 and in which is mounted rotatably about the axis Z a first portion 29 of a second positioning member, designated as a whole by the reference 30, having a second portion or actuating portion 31 outside the valve body 8. In the embodiment illustrated in FIGS. 1 and 2, the first portion 29 takes the form of an elongate sheet-metal element produced in one piece with the second portion 31 shaped in the form of an arm of rounded profile which moves angularly in the vicinity of an outer cut-off face 32 of the valve body 8 and the rear face of which is capable of interacting in rolling engagement contact with a stationary surface connected to the housing and consisting typically of the front annular face 33 of the elastomeric gasket of the guide and sealing assembly 9 mounted in the tubular extension 10. The first portion 29 of the second retaining member has centrally, in its zone projecting into the bore 15, a cut-out part bent forwards and profiled to form a cam surface 34 capable of interacting with a zone of the first shoulder 21 located on the side of the diametral plane D opposite the key 23.

Figure 2:
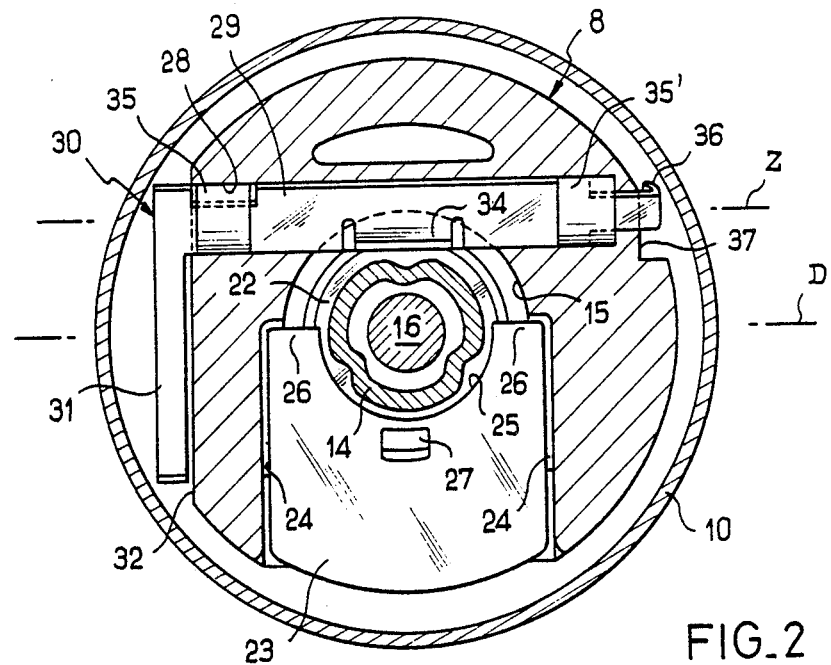
FIG. 2 is a diagrammatic cross-sectional view in the sectional plane II—II of FIG. 1.

The mode of operation of the booster according to the invention is as follows:

When the booster is actuated exerting a forward axial force on the rod 16, the plunger 14 moves forwards in the bore 15 and in the first place, after a brief initial actuating stroke, causes the flap element 11 to come into contact with the fixed flap seat 12 to isolate the two chambers 5 and 6 from one another and then, in the second place, to open a passage between the flap element 11 and the movable flap seat 13 to admit the atmospheric pressure into the working chamber 6 and thus provide power assistance on the output rod 19. During such a braking phase, the plunger 14 does not interfere with any of the positioning means 23 and 30. In the event of failure of the vacuum source, the plunger 14 comes up against the key 23 by means of its second shoulder 22, thus connecting the input rod 16 and the output rod 19 in terms of thrust in the non-assisted mode. If, in normal assisted operation, during such a braking phase the force exerted on the input rod 16 is relaxed, the rod 16 moves rearwards relative to the valve body 8 under the effect of the restoring spring 17, and the plunger 14, returning into contact by means of its movable seat 13 with the flap element 11, moves the latter elastically rearwards to free it from the fixed flap seat 12 and restore communication between these two chambers 5 and 6. To allow a rapid recovery of balance in pressure (in this particular case, partial vacuum) between these two chambers 5 and 6, the plunger 14 is allowed to move back over a relatively long distance in relation to the valve body 8, the passage between the fixed flap seat 12 and the flap element 11 being determined accurately because the first shoulder 21 comes up against the key 23 under the effect of the restoring spring 17. During this operating phase, the second positioning member 30, pivoting freely in the valve body 8, does not interfere with the movement of the plunger 14 relative to the valve body 8. In contrast to this, when the force exerted on the input rod 16 is finally released, the movable wall 4 is brought up against the rear wall 3 of the housing 1 under the effect of its own restoring spring 38. At the same time, when the booster arrives in the vicinity of its position of rest, the arm 31 of the second positioning member 30 comes up against the stationary surface 33, causing the first portion 29 to rotate to the right (in FIG. 1), so that the same surface 34, by interacting with the first shoulder 21 of the plunger 14 which has hitherto maintained a relative position of retraction, brings the latter forwards from its previous position of retraction, so as to reduce the play between the flap element 11 and the fixed flap seat 12. This play at rest, corresponding to the idle actuating stroke of the booster, is therefore defined accurately and in a perfectly reproduceable way by the angular position finally assumed by the second positioning member 30 bearing on the stationary surface 33 when the movable wall 4 has come up against the rear wall 3, as shown in FIG. 1. This play can be modified and determined with great accuracy according to the shaping of the arm 31 and/or the first cam surface 34, and the maximum position of retraction or of excess opening during the return of the plunger 14 relative to the valve body 8 is likewise determined with great accuracy as a result of the construction, substantially independently of the second positioning member 30, by the axial distance between the radial groove 24 receiving the key 23 and the fixed flap seat 12.

The first portion 29 of the second positioning member 30 is advantageously associated with a pair of plastic cylindrical bearings 35 and 35' fitted laterally onto the respective ends of the strip 29 to guarantee that the latter is centered in the bore 28 in terms of rotation. There will advantageously be a slight friction effect between the bearings 35 and 35' and the bore 28 to reduce the capacity of the second retaining member 30 to move freely in the valve body 8. In the embodiment illustrated in FIG. 2, the second retaining member 30 is held in place in the valve body 8 by making one end of the first portion 29 opposite the arm 31 in the form of a tongue 36 which passes through one end of reduced diameter of the bore 28 and which is then bent laterally in the vicinity of a second flat face of small dimensions 37 formed in the periphery of the valve body 8.

Figure 4:
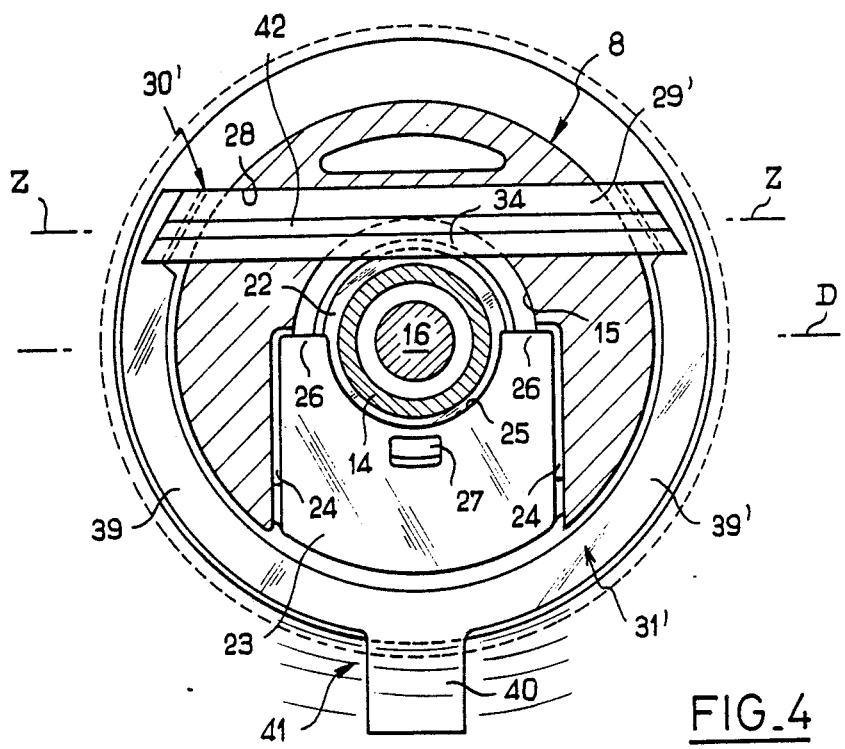
FIG. 4 is a cross-sectional view, similar to that of FIG. 2, of the embodiment shown in FIG. 3.
Figure 3:
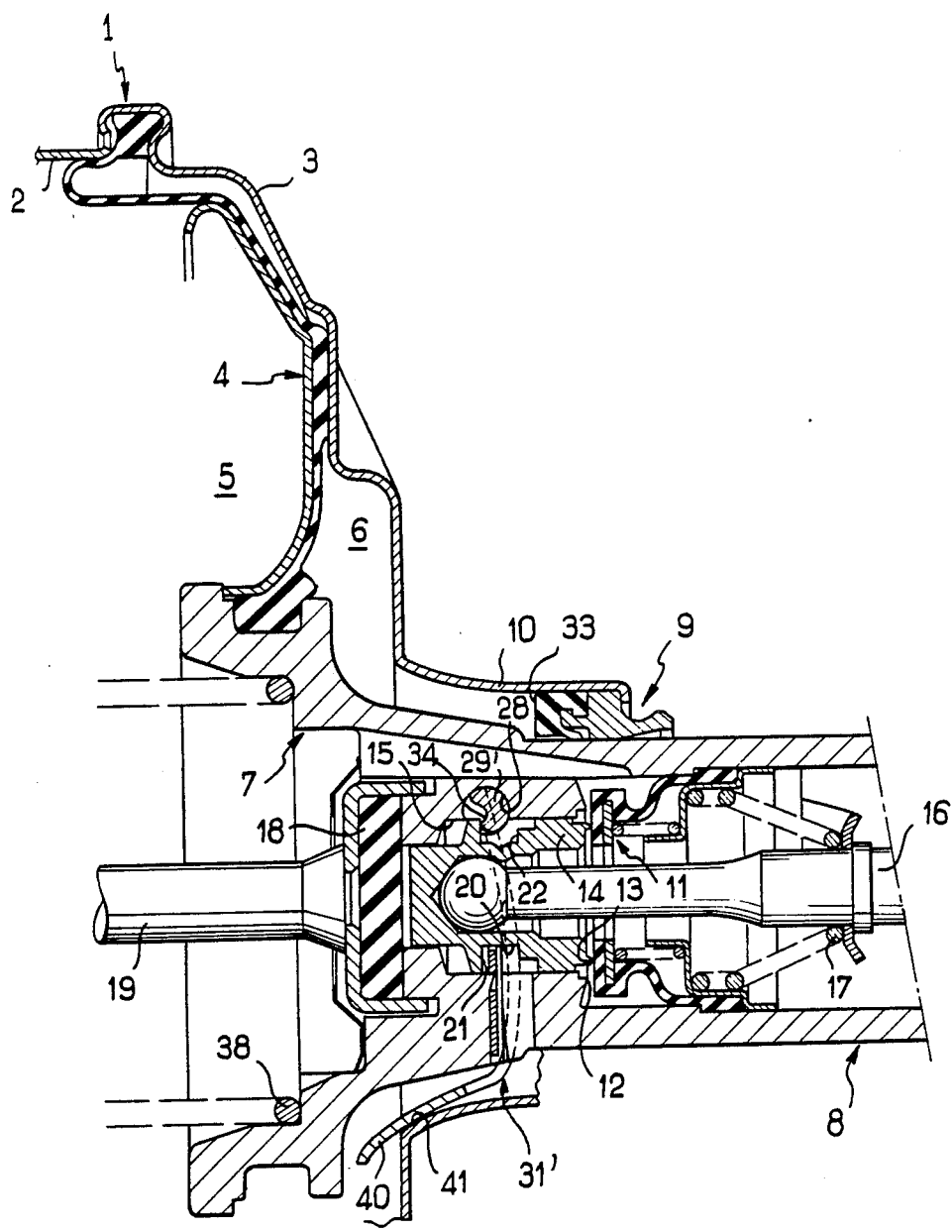
FIG. 3 is a view similar to that of FIG. 1, showing a second embodiment of the invention.

The embodiment illustrated in FIGS. 3 and 4 is, in broad terms, similar to that just described and differs from it essentially in the shape of the second member 30'. In this embodiment, the first portion 29' takes the form of a member mounted rotatably about the axis Z in the bore 28 of the valve body 8 and projecting laterally on either side of the latter. Fitted on the projecting ends of the first portion 29', for example by means of butt-insertion, are the ends of a pair of arms 39, 39' in the form of arcs of a circle of an inner and an outer radius which, as seen in a plan view (FIG. 4), are respectively slightly greater than the radius of a circle escribed relative to the valve body 8 and less than the inner radius of the tubular extension 10. The two arms 39 and 39', produced from a metal sheet, meet centrally, opposite the first portion 29' in relation to the diametral plane D, to form a profiled tongue 40 extending forwards and forming a follower cam element intended to interact slideably with a stationary cam surface 41 consisting, for example, of the connecting profile between the tubular extension 10 and the adjacent central radial zone 40 of the rear wall 3 of the housing 1. In the embodiment illustrated in FIGS. 3 and 4, the cam surface 34 is formed by a profiled groove 42 cut longitudinally in the solid first portion 29'. Alternatively, the first portion 29' can be produced in the form of a tube of rolled sheet metal, a central portion of which is deformed and profiled in a suitable way to form the cam surface 34.

The mode of operation of this second embodiment is identical in all respects to that described above with reference to FIGS. 1 and 2, except that, here, the position of rest of the plunger 14 assigned by the ramp surface 34 is not determined by coming up against the second portion 31' axially, but by the position in space of the point of contact between the tongue 40 and the ramp surface 41, when the movable wall 4 is up against the rear wall 3 of the housing 1, and this point of contact can be determined accurately by giving the arms 39 and 39' and the tongue 40 a suitable shape.

I claim:

1. A brake booster comprising a housing, a piston structure dividing the housing internally into two chambers, distribution valve means arranged in a valve body which is connected with the piston structure and actuable by means of an input member to generate selectively a pressure differential between the chambers, the valve means comprising a plunger mounted axially and slidably in a central bore of the valve body and connected to the input member, the plunger having at least one first shoulder and defining at an end a first flap seat, a second flap seat formed in the valve body concentrically relative to the first flap seat, and flap means mounted in the valve body and stressed elastically toward the first and second flap seats, a restoring spring bearing in the valve body and stressing the input member in a direction opposite the flap seats, and means for positioning the plunger which is arranged in the valve body and which interacts with the plunger to assign to the plunger at least two separate specific positions relative to the valve body, characterized in that the positioning means comprises the combination of a first positioning member fastened in the valve body and having an inner end capable of interacting with a first zone of the first shoulder of the plunger to position the plunger in a specific position of retraction relative to the valve body, and a second positioning member mounted pivotally in the valve body and having a first portion capable of interacting with a second zone of the first shoulder of the plunger and a second portion capable of interacting, in the vicinity of a position of rest of the booster, with a stationary element connected to the housing in order, at least in the position of rest, to place the second positioning member in a specific angular position which positions the plunger, via the first portion of the second positioning member, in a specific position of rest relative to the valve body, the first zone of the first shoulder of the plunger and the second portion of the second positioning member interacting with the stationary element being located on one and the same side relative to a diametral plane of the plunger, and the second zone of the first shoulder and first portion of the second positioning member being located on the other side of the diametral plane.

2. The booster according to claim 1, characterized in that the plunger has a second shoulder facing axially the first shoulder and capable of interacting with the inner end of the first positioning member in a third specific position of the plunger relative to the valve body.

3. The booster according to claim 2, characterized in that the first positioning member comprises a substantially a flat key mounted in a radial groove of the valve body and the inner end projecting into the central bore of the valve body and into a peripheral annular groove of the plunger forming the first and second shoulders.

4. The booster according to claim 1, characterized in that the first portion of the second positioning member comprises an elongate element pivoting in a transverse receptacle in the valve body and has a cam surface projecting into the central bore.

5. The booster according to claim 4, characterized in that the second portion of the second positioning member comprises at least one profiled tracer lever located outside the valve body and attached to one end of the elongate element.

6. The booster according to claim 5, characterized in that the tracer lever and the elongate element are produced in one piece from sheet metal.

7. The booster according to claim 6, characterized in that the elongate element is supported rotatably in the transverse receptacle of the valve body by means of two plastic bearings.

8. The booster according to claim 5, characterized in that the tracer lever has two curved arms matching a peripheral profile of the valve body and connected to respective ends of the elongate element.

9. The booster according to claim 1, characterized in that the second portion of the second positioning member bears axially against the stationary element, in the position of the rest of the booster.

10. The booster according to claim 1, characterized in that the second portion of the second positioning member interacts in sliding contact, in the vicinity of the position of rest of the booster, with a cam surface formed by the stationary element.

11. The booster according to claim 10, characterized in that the cam surface is formed by the rear wall of the housing.

* * * * *